Patented Sept. 22, 1925.

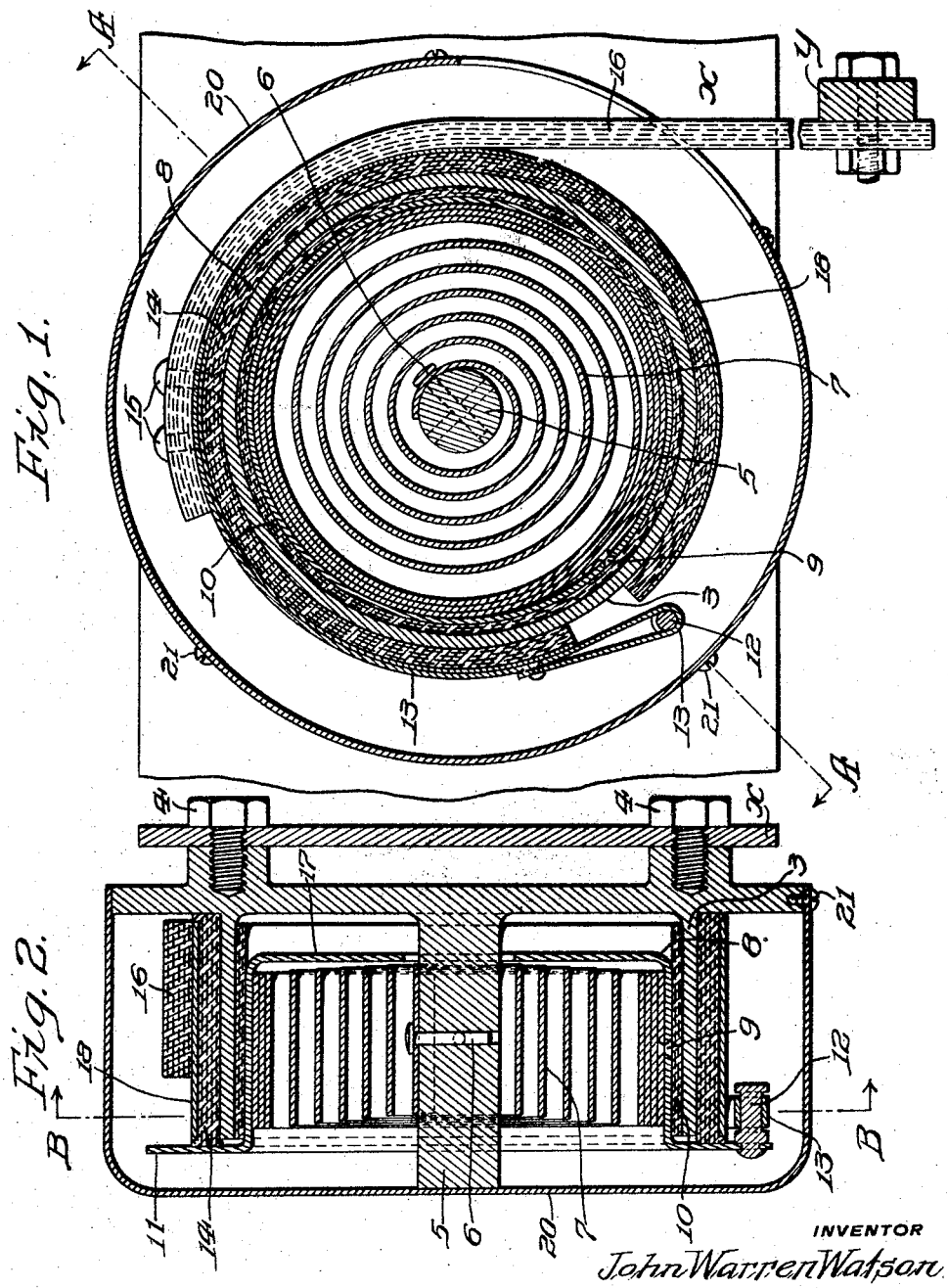

1,554,930

UNITED STATES PATENT OFFICE.

JOHN WARREN WATSON, OF WAYNE, PENNSYLVANIA.

MOTION-CONTROLLING MECHANISM.

Application filed December 4, 1919. Serial No. 342,469.

*To all whom it may concern:*

Be it known that I, JOHN WARREN WATSON, a citizen of the United States, and a resident of Wayne, in the county of Delaware and State of Pennsylvania, have invented certain new and useful Improvements in Motion-Controlling Mechanism, of which the following is a specification, reference being had to the accompanying drawings.

This invention relates to a novel combination for controlling, regulating or checking relative movement in one direction between any two elements, and in particular relates to that class of mechanism intended to check the too rapid separation between the sprung and unsprung portions of a vehicle and, in particular, a motor vehicle.

A particular object of my invention is to provide a spring-controlled friction mechanism with spring-retaining means for maintaining the spring itself out of contact with other relatively movable parts of the mechanism. A further object of my invention is to provide a bearing for said spring-retaining means which is of such proportions, and which is so associated with another part of the mechanism, as to insure, for long periods of service, the maintaining of said spring retainer in substantially unchanged relation with one of the co-acting friction members.

To accomplish the above, in the embodiment shown and described herewith, I include a drum member secured to one of two relatively movable elements, a friction member in contact with said drum member and secured to the other relatively movable element, a spring connecting said drum member and said friction member, a retainer for said spring, and novel and ample bearing means for maintaining said retainer in substantially concentric relation with said drum for the above-mentioned long periods of service.

Various combinations of elements and different means could be readily employed to obtain the results secured by the mechanism disclosed without departing from the spirit and scope of this invention, the illustrations herewith being merely by way of example.

One embodiment of this invention is shown by the accompanying drawings in which Fig. 1 is a sectional view on line BB Fig. 2. Fig. 2 is a sectional view on line AA Fig. 1.

Referring to Fig. 1, X and Y represent relatively movable elements, whose motion, one relative to the other, it is desired to check, regulate or control. These elements are illustrated merely diagrammatically for the purpose of indicating that this invention may be applied and utilized in connection with various combinations of elements which move, one relatively to the other, and whose movement it is desired to effectively control.

A drum member 3 is carried by the element X and is secured thereto by any suitable means such as by cap screws 4. Extending from the drum member 3 is a stud 5. Secured to this stud 5, as for example by the pin 6, is a spring 7. The other end of spring 7 is secured to a spring retainer or housing 8 by any suitable means such as, for example, by a rivet 9. Spring retainer 8 is free to rotate with relation to drum member 3. If desired, for the purpose of minimizing wear between spring retainer 8 and drum member 3, or for minimizing friction and hence facilitating the relative rotation of these members, a bushing or liner 10, of any suitable material, may be interposed as illustrated. As illustrated in the present embodiment, spring retainer 8 is provided with an outwardly extending flange 11 to which is secured, as for example by riveting, a stud or pin 12. Secured to this pin 12, in any suitable manner as, for example, by merely looping over it, is a strap member 13, which is also secured to a friction member 14 by means of rivets 15. Friction member 14 may be provided with a backing 18, as shown, if desired, for the purpose of additional strength or for the purpose of flexibly maintaining any given curvature to member 14.

Also secured to friction member 14 as, for example, by means of rivets 15 is a power transmitting member or strap 16, which strap is secured also to element Y. Spring retainer 8, in the embodiment here illustrated, is also provided with an inwardly extending flange 17. This flange serves to maintain, in their respective correct positions, the parts above referred to. None of the parts can slide off the drum without pushing flange 11 before them, and flange 11 cannot be so pushed because flange 17, as illustrated, is almost immediately in contact with one or more edges of the inner convolutions of spring 7 and can go no farther. Cover member 20 is secured to drum member 3 by any suitable means, such as, for example, by screws 21. This cover member 20 is provided with a slot or window for the passage of strap 16.

The drum member 3 and the friction member 14 constitute one type of co-acting friction members, although it is apparent that these members may be made in any other shape than that of a purely cylindrical drum and a split ring, and relatively associated in various other ways than that just described, and still incorporate therein the essentials of my invention. While I have here illustrated but one form of spring retaining means and have shown but one example of associated the spring retaining means with the drum member, it will nevertheless be apparent that these members may be made in any other shapes than those illustrated, and may be relatively associated in various other ways, and still incorporate therein the essentials of my invention.

As attached, in the present instance, to elements X and Y, the invention is operative to retard or control the relative separation of these elements without retarding their relative approach. It is believed that the operation of the device, as shown in the present instance, will require no explanation. To those skilled in the art, it will be readily understood that upon the approach of elements X and Y, the spring 7 will immediately act to revolve friction member 14 around drum 3 in a counter-clockwise direction and will, at the same time, wind up the strap 16 upon friction member 14 to whatever extent the approach of elements X and Y permits. The separation of elements X and Y would be retarded by the friction between member 14 and drum 3. This friction, of course, is augmented by the strength of spring 7 which holds back, in the opposite direction, on member 14. In the embodiment shown, the strength of spring 7 may be advanced or retarded by quarter revolutions according to the placing of pin 6 in stud 5.

While I have illustrated and described a preferred form of construction for carrying my invention into effect, this is capable of variations and modifications without departing from the spirit of the invention. I, therefore, do not wish to be limited to the precise details of construction set forth, but desire to avail myself of such variations and modifications as come within the scope of the appended claims.

Having thus described my invention, what I claim and desire to protect by Letters Patent of the United States is:

1. In mechanism for retarding motion between two relatively movable elements, a drum adapted to be secured to one of said elements, a friction member in contact with said drum and adapted to be connected to said other element, a spring so associated with said drum and said friction member as to tend to relatively move them in one direction, a retainer for said spring and a bearing for said retainer, said bearing being greater in diameter than the smallest convolution of said spring.

2. In mechanism for retarding motion between two relatively movable elements, a drum adapted to be secured to one of said elements, a friction member in contact with said drum and adapted to be connected to said other element, a spring so associated with said drum and said friction member as to tend to relatively move them in one direction, a retainer for said spring and a bearing for said retainer, said bearing being on the outside diameter of said retainer and independent of said friction member.

3. In mechanism for retarding motion between two relatively movable elements, a drum adapted to be secured to one of said elements, a friction member in contact with said drum and adapted to be connected to said other element, a spring so associated with said drum and said friction member as to tend to relatively move them in one direction, a circumferential retainer for said spring and a bearing for said retainer against said drum and independent of said friction member.

4. In mechanism for retarding motion between two relatively movable elements, a drum member adapted to be secured to one of said elements, a friction member in contact with said drum member and adapted to be connected to said other element, a spring so associated with said drum member and said friction member as to tend to relatively move them in one direction, a retainer for said spring and a bearing for said retainer against the drum portion of said drum member and independent of said friction member.

5. In mechanism for retarding motion between two relatively movable elements, a drum member adapted to be secured to one of said elements, a friction member in contact with said drum member and adapted to be connected to said other element, a spring so associated with said drum member and said friction member as to tend to relatively move them in one direction, a retainer for said spring and a bushing, independent of said friction member, interposed between said retainer and the drum portion of said drum member.

6. In mechanism for retarding motion between two relatively movable elements, a drum member adapted to be secured to one of said elements, a friction member in contact with said drum member and adapted to be connected to said other element, a spring so associated with said drum member and said friction member as to tend to relatively move them in one direction, a retainer for said spring and a bearing, independent of said friction member, for said retainer, said retainer being maintained in substantially concentric relation with said drum member by a surface of the drum portion of said drum member.

7. In mechanism for retarding motion between two relatively movable elements, a drum adapted to be secured to one of said elements, a friction member in contact with said drum and adapted to be connected to said other element, a spring connected to said drum and to said friction member, means for maintaining said spring out of rubbing contact with said drum, and a bearing for said means against a surface of said drum but independent of said friction member.

8. In mechanism for retarding motion between two relatively movable elements, a drum adapted to be secured to one of said elements, a friction member in contact with said drum and adapted to be connected to said other element, a spring connected to said drum and to said friction member, a retainer for said spring, and a single bearing independent of said friction member for maintaining said retainer in substantially concentric relation with said drum.

9. In combination, for the purpose of retarding relative motion between two relatively movable elements, a cylindrical member adapted to be secured to one of said elements, a friction member in contact with said cylindrical member and adapted to be connected to said other element, a spring so associated with said two members as to relatively move them in one direction, means for maintaining the outer convolution of said spring within pre-determined limits regardless of the extent to which said spring may be wound up or unwound, and a bushing independent of said friction member for maintaining said spring-limiting means in substantially concentric relation with said cylindrical member.

10. In mechanism for retarding relative motion between two relatively movable elements, a curved member adapted to be secured to one of said elements, a friction member in contact with said curved member and adapted to be connected to said other element, a spring for relatively moving said members, a substantially cylindrical housing for said spring and a bearing for said housing, on the cylindrical surface of said housing.

11. In mechanism for retarding motion between two relatively movable elements, a drum adapted to be secured to one of said elements, a friction member in contact with said drum and adapted to be connected to said other element, a spring so associated with said drum and said friction member as to tend to relatively move them in one direction, a flanged retainer for said spring and a bearing for said retainer against said drum but independent of said friction member.

12. In mechanism for retarding motion between two relatively movable elements, a drum member adapted to be secured to one of said elements, a friction member in contact with said drum member and adapted to be connected to said other element, a spring so associated with said drum member and said friction member as to tend to relatively move them in one direction, a flanged retainer for said spring and a bearing for said retainer against the drum portion of said drum member but independent of said friction member.

13. In mechanism for retarding relative motion between two elements, two co-acting friction members adapted to be connected respectively to said elements, a spring so associated with said members as to relatively move them in one direction under pre-determined conditions, a substantially cylindrical double-flanged retainer for said spring and a bearing, independent of said friction member, for said retainer.

14. In mechanism for retarding relative motion between two elements, a drum adapted to be secured to one of said elements, a strap adapted to be connected to said other element and positioned about the drum, a spring operative to keep said strap taut while said elements approach each other, a one-piece housing for said spring movable with a portion thereof and a bearing independent of said friction member, for said housing.

15. In mechanism for retarding relative motion between two elements, a drum with means for attachment to one of said elements, a friction member in contact with said drum, a strap attached to said friction member and means for connecting said strap to said other element, a spring for moving the friction member around the drum, a substantially cylindrical retainer for said spring and a bearing bushing on the outside of said retainer but independent of said friction member.

16. In mechanism for retarding motion between two relatively movable elements, a drum member adapted to be secured to one of said elements, a friction member in contact with said drum member and adapted to be connected to said other element, a spring so associated with said drum member and said friction member as to tend to relatively move them in one direction, and means structurally independent of the friction member, so supported by the drum portion of said drum member as to maintain the travel of the outermost ends of said spring substantially concentric with said drum member.

17. In mechanism for retarding motion between two relatively movable elements, a drum member adapted to be secured to one of said elements, a friction member in contact with said drum member and adapted to be connected to said other element, and a spring so associated with said drum member and said friction member as to tend to relatively move them in one direction, the outermost end of said spring being so supported independently of the friction member by the drum portion of said drum member as to cause said end to travel in substantially concentric relation with said drum portion.

18. In combination, a cylindrical member, a friction member, partially surrounding said cylindrical member, a spring positively connecting said two members and tending to revolve the friction member around the cylindrical member in one direction, a member so associated with said spring as to hold the outer end of said spring away from contact with said cylindrical member, and a single bearing independent of said friction member for said member capable of maintaining the relative positions of said member and said cylindrical member.

19. In combination, a cylindrical member, a friction member, partially surrounding said cylindrical member, a spring positively connecting said two members and tending to revolve the friction member around the cylindrical member in one direction, a member so associated with said spring as to hold an end portion of said spring away from contact with said cylindrical member, and a single bearing independent of said friction member, capable of maintaining the relative positions of said spring-holding member and said cylindrical member.

20. In mechanism adapted for use in connection with two relatively movable elements for checking their relative motion in one direction, a drum adapted to be secured to one of said elements, a flexible member, a friction member, in the form of a split ring, in contact with said drum and adapted to be connected to said other element by the flexible member, a spring so associated with said drum and said friction member as to tend to rotate said friction member around said drum and also to wind said flexible member upon said friction member, said flexible member being attached to said friction member at a point thereon which makes it possible for the device to operate throughout its working range without necessitating that said flexible member be wound said friction member beyond the gap in said friction member, means for holding an end portion of said spring out of contact with said drum and a single bearing independent of said friction member for maintaining, with relation to said drum, the rotative position of said last-mentioned means.

21. In mechanism for retarding motion between two relatively movable elements, a drum member adapted to be secured to one of said elements, a friction member in the form of a split ring in contact with said drum member and adapted to be positively connected to said other element, a spring so associated with said drum member and said friction member as to tend to relatively move them in one direction, and means independent of the friction member for maintaining the travel of the outermost end of the spring substantially concentric with said drum member.

22. In mechanism for controlling the recoil of a vehicle spring, the combination of a fixed drum, a revolvable drum, a spring within said revolvable drum for revolving it in one direction, a flexible member connected to said revolvable drum for revolving it in the opposite direction, and a friction-governing liner member inside of the fixed drum and between said fixed drum and the revolvable drum.

23. In mechanism for controlling the recoil of a vehicle spring, the combination of a fixed drum, a revolvable drum supported by said fixed drum, a spring connected to said revolvable drum for revolving said drum in one direction, and a flexible member connected to said revolvable drum for revolving said drum in the opposite direction, the pressure between said drums being less and hence there being less frictional resistance to the revolving of said revolvable drum when said drum is revolved by the spring than when said drum is revolved by the flexible member.

24. In mechanism for controlling the recoil of a vehicle spring, the combination of a fixed drum, a revolvable drum supported by said fixed drum, a spring connected to said revolvable drum for revolving said drum in one direction, a flexible member connected to said revolvable drum for revolving said drum in the opposite direction, and a liner member interposed between said drum members, said liner member being under less compression and hence offering less frictional resistance to the revolving of said revolvable drum when said drum is revolved by the spring than when said drum is revolved by the flexible member.

25. In combination, a cylindrical member, a friction member, partially surrounding said cylindrical member, a spring positively connecting said two members and tending to revolve the friction member around the cylindrical member in one direction, a fourth member so associated with said spring as to hold the outer end of said spring away from contact with said cylindrical member, and a single bearing for said fourth member capable of maintaining the relative positions of said fourth member and said cylindrical member.

26. In combination, a cylindrical member, a friction member, partially surrounding said cylindrical member, a spring positively connecting said two members and tending to revolve the friction member around the cylindrical member in one direction, a fourth member so associated with said spring as to hold an end portion of said spring away from contact with said cylindrical member, and a single bearing for said fourth member capable of maintaining the relative positions of said fourth member and said cylindrical member.

27. In mechanism adapted for use in connection with two relatively movable elements for checking their relative motion in one direction, a drum adapted to be secured to one of said elements, a flexible member, a friction member, in the form of a split ring, in contact with said drum and adapted to be secured to said other element by the flexible member, a spring so associated with said drum and said friction member as to tend to rotate said friction member around said drum and also to wind said flexible member upon said friction member, said flexible member being attached to said friction member at a point thereon which makes it possible for the device to operate throughout its working range without necessitating that said flexible member be wound upon said friction member beyond the gap in said friction member, means for holding the outer end of said spring out of contact with said drum and a single bearing capable of maintaining, with relation to said drum, the rotative position of said last-mentioned means.

28. In mechanism adapted for use in connection with two relatively movable elements for checking their relative motion in one direction, a drum adapted to be secured to one of said elements, a flexible member, a friction member, in the form of a split ring, in contact with said drum and adapted to be secured to said other element by the flexible member, a spring so associated with said drum and said friction member as to tend to rotate said friction member around said drum and also to wind said flexible member upon said friction member, said flexible member being attached to said friction member at a point thereon which makes it possible for the device to operate throughout its working range without necessitating that said flexible member be wound upon said friction member beyond the gap in said friction member, means for holding an end portion of said spring out of contact with said drum and a single bearing for maintaining, with relation to said drum, the rotative position of said last-mentioned means.

In witness whereof, I have hereunto set my hand this second day of December, A. D. 1919.

JOHN WARREN WATSON.